United States Patent [19]
Bischoff et al.

[11] 3,917,552
[45] Nov. 4, 1975

[54] SELF POLISHING CLEANING FLOOR WAX
[75] Inventors: Edelbert Bischoff, Kirchheimbolanden; Willi Hessler, Wiesbaden, both of Germany
[73] Assignee: Werner & Mertz GmbH, Mainz, Germany
[22] Filed: July 22, 1974
[21] Appl. No.: 490,406

Related U.S. Application Data
[63] Continuation of Ser. No. 395,591, Sept. 10, 1973, abandoned, Continuation of Ser. No. 235,781, March 17, 1972, abandoned.

[30] Foreign Application Priority Data
Mar. 26, 1971 Germany............................ 2114843

[52] U.S. Cl.................... 260/28.5 R; 260/28.5 AV
[51] Int. Cl.² .................... C08L 91/08; C08L 91/06
[58] Field of Search ................ 260/28.5 R, 28.5 AV

[56] References Cited
UNITED STATES PATENTS
| | | | |
|---|---|---|---|
| 3,457,208 | 7/1966 | Sullivan et al. | 260/28.5 |
| 3,467,610 | 9/1969 | Fiarman et al. | 260/28.5 |
| 3,666,500 | 5/1972 | Lange et al. | 260/28.5 |

*Primary Examiner*—Melvyn I. Marquis
*Attorney, Agent, or Firm*—Karl F. Ross; Herbert Dubno

[57] ABSTRACT

A selfpolishing cleaning floor wax having, as essential components, a synthetic-resin dispersion (preferably containing a styrene-acrylic copolymer), and an emulsified oxidized polyethylene in an amount of 0.5 to 50% by weight of the dry product. The oxidized polyethylene is of the short-molecule type with a molecular weight of 5,000 to 20,000, an acid titer or number between 20 and 50 and a softening point between 120° and 150°C.

1 Claim, No Drawings

SELF POLISHING CLEANING FLOOR WAX

This application is a continuation of Ser. No. 395,591 filed Sept. 10, 1973 as a continuation of Ser. No. 235,781 filed Mar. 17, 1972, both abandoned.

FIELD OF THE INVENTION

Our present invention relates to improved floor coverings and, more particularly to a selfpolishing cleaning floor wax.

BACKGROUND OF THE INVENTION

Floor-treating preparations designed to leave a protective layer upon the surface to which they are applied, can generally be divided into three categories, namely, selfpolishing preparations, selfpolishing cleaning preparations and cleaning preparations without selfpolishing properties.

The term quoted "selfpolishing" is herein used to refer to a selfbrightening, shining or glossing effect wich results upon drying and without wiping. "Cleaning" refers to the ability of a floor-coating preparation of the character described to remove soils, stains, old covering materials and facilitate the transfer of such materials to the applicator or the trapping of the materials within the newly applied layer so that they are able to effect the translucency or brightness (gloss) only to a limited extent. So called "cleaning waxes" are those which require some degree of mechanical polishing to provide a high gloss.

While a large number of floor-polishing systems have been provided heretofore with one or another of the foregoing properties, it has generally been difficult to find a truly selfpolishing cleaning floor preparation with hardness, resistance to wear (toughness), gloss retention, adhesion to the substrate, and surface-coating ability.

It should be mentioned that it is known to incorporate synthetic-resin dispersions in such preparations, e.g. styreneacrylic copolymers, to provide natural or synthetic waxes or modified waxes in such systems, and even to use various latex-type dispersions with plasticizers, washing agents and the like. Considerable effort has, however, been expanded in order to include the cleaning and the selfglossing aspects of floor polishing materials since the experience in the art has hitherto been that the two characteristics are in opposition.

OBJECTS OF THE INVENTION

It is the principal object of the present invention to provide an improved floor-polishing composition which avoids the aforementioned disadvantages and provides improved toughness, gloss and resistance to scuffing and abrasion.

Another object of the invention is to provide an improved selfpolishing cleaning floor preparation which has enhanced cleaning effects, adhesion to the substrate and brightness.

Still another object of the invention is the provision of a cleaning wax or, more generally, floor-coating preparation, which combines characteristics hitherto found in only some of the categories of floor-polishing preparation discussed above.

DESCRIPTION OF THE INVENTION

The present invention is based upon our discovery that the foregoing objects can be attained by incorporating in an amount of 0.5 to 50% by weight of the dry product, an emulsified short-molecule linear, oxidized polyethylene (polymer wax) with a molecular weight between 5000 and 20,000, an acid titer or number between 20 and 50 and a softening point between 120° and 150°C in a floor-polishing composition which also contains at least one synthetic resin in an acrylic emulsion containing, in addition, a cleaning substance. As will be apparent, this specific type of oxidized polyethylene imparts to any conventional floor-polishing preparation containing emulsified synthetic resin of the styrene-acrylate type, for example, with or without other substances conventional in such preparations, a highly improved tenacity, toughness, glossing power, film-forming character and cleaning power wich has been found to be substantially synergistic. Thus, while one normally would not expect the presence of a substance such as polyethylene to increase the cleaning power of a selfpolishing floor preparation into which it is incorporated, investigations have demonstrated that the cleaning power is enhanced beyond that which would be expected from either the cleaning agent or the polyethylene alone or the two combined. In other words, the oxidized polyethylene so interacts with the other components of the composition as to sharply increase the cleaning power while at the same time enhancing all of the other important properties of the foregoing materials.

Most surprisingly, it has been found that the incorporation of the specific oxidized polyethylene in synthetic-resin emulsions of the type hitherto used in selfpolishing or floor-treating preparations is able to provide a composition having the cleaning power of the non-selfpolishing preparations mentioned earlier with the self-glossing character of the non-cleaning floor preparations without deterioration of either the wearing power or the polishing characteristics of the latter type of floor coating. In addition, the cleaning is found to be effectively greater than that which is obtained with self-polishing-cleaning floor preparations and equal to the cleaning of the organic type of preparations which have solvents facilitating soil removal. The long wearing gloss without wiping can be enhanced by mechanical polishing if desired as is known with conventional floor treating preparations.

It should not be overlooked that the preparations according to the present invention have high antiscuffing power and, indeed, appear to be more scuff-resistant than the hard selfpolishing preparations known heretofore. The term quoted "scuff resistance" or "antiscuff properties" is used herein to denote the resistance of the preparation to traffic, penetration or scratching by the shoe of the user, etc. The dry polish layer moreover has an unexpectedly high density and hardness which may be due in part to a high oxygen content.

The composition according to the invention may contain other components in addition to the synthetic resin and polyethylene components mentioned above. These components include substances commonly found in selfpolishing waxes containing synthetic-resin dispersions. The substances may be resins, plasticizer, washing agent, emulsifying agent and cleaning agents, the latter being generally employed in the proportions common in the art.

The oxidized polyethylene according to the present invention, constitutes a wiping agent which provides, upon a mechanical polishing of the dry layer, an improved gloss as noted above. As a consequence, it imparts to the composition the properties of the products of the third category described above, namely, the properties of the so-called cleaning waxes. The effect of the oxidized polyethylene is, of course, not apparent in all respects. For example, the solvent-type cleaning action may be attributed to the nature of the oxidized polyethylene chains which have solvent characteristics. The acid and other oxygen-containing groups appear to promote cleaning in the manner described. However, we are unable to satisfactorily explain the synergistic cleaning properties and the improved self-brightening properties, without wiping, which are obtained when the oxidized polyethylene is used, especially when it is understood that the oxidized polyethylene is a wiping agent in the sense that it promotes still higher gloss when the finish is rubbed or mechanically buffed.

The oxidized polyethylene according to the present invention is preferably a low-pressure (high-density) polyethylene as made by the Phillips process (see Belgian Pat. Nos. 535,082 and 530,617) and subjected to oxidative cracking until the average chain length is 500 to 600 carbon atoms and the average molecular weight is between 5,000 and 20,000, the desirable range between 6,000 and 20,000 and the preferred range between 8,000 and 10,000, although molecular weights in the range of 6,000 to 20,000 are effective. In other words, the operable range of molecular weights is between 5,000 and 20,000, a desirable range lies between 6,000 and 20,000 and the preferred range is between 8,000 and 10,000.

The oxidative cracking of the low-pressure polyethylene made in accordance with the Phillips process is carried out until about 3% by weight of oxygen is present in the polyethylene, the latter has an acid titer of 20 to 50 as noted earlier and a softening point in the range of 120° to 150°C. Best results are obtained when the oxidation of the polyethylene is carried out under such conditions that the acid titer or number ranges between 20 and 30 (preferably about 26.1), the esterification number is 10 to 20 (preferably about 15.5) and about ¼ of the oxygen is chemically bound in functional groups other than acid and ester, generally as hydroxyl, carbonyl and peroxide, the latter in traces. As is well-known, the Phillips process can produce a practically linear, highly crystalline, hard, and dense polyethylene with a relatively high softening point. These characteristics remain in the oxidized polyethylene so that the resulting body, which cannot be compared with earlier waxes or synthetic resin floor coating, has a hardness of 0.5d mm (needle penetrometer according to ASTM standard D 1321, D-5) at 100 grams/5 sec./25°C. Softening point = 138° - 147°C according to ASTM standard E 28; $D_{20} = 0.99$; viscosity = 9,000 cp at 149°C according to the Brookfield viscosmeter. The viscosity is 1,500 cp at 140°C. The corresponding values for a conventional hard wax (natural wax) with a similar acid number is hardness = 2 – 3, softening point = 100° – 110°C, $D_{20} = 0.92 - 0.93$, molecular weight = 2,000 – 3,000 and viscosity = 400 cp at 140°C.

The oxidation renders the linear polyethylene emulsifiable and enables it to be dispersed in the floor-polishing composition, especially if a high gloss is desired, in very finely divided and uniform form. We prefer to employ, because of the importance of the uniformity of oxidation and dispersion, an oxidized polyethylene of the type described as AC 392 in the article Polyethylene Waxes in Paints and Varnishes, E Dyssolear in "Paint Manufacture" 1970, pages 24ff. The physical properties of the product AC 392 in term of viscosity, density, hardness and melting point will become clear from Table 1 of this publication.

According to an important feature of the invention, an emulsifying component is incorporated in the composition together with the oxidized polyethylene, this emulsifying composition comprising, as one component, a nonionic emulsifying surface active agent of the alkyl phenol polyethoxy-adduct type. Advantageously the alkyl group has a carbon number ranging between 6 and 10 and the ethoxy number per molecule ranges between 5 and 15. The molecule may terminate in a low molecular weight alcohol, e.g. ethanol, a glycol or the like. Best results have been obtained with nonionic surfactants in which the alkyl group contains 7 to 10 carbon atoms and 6 to 12 ethylene oxide groups are provided per molecule. We have found that the isoctyl phenolpolyethoxyethanol (10 molecular ethylene oxide per molecule) is the most desirable. isooctyl The emulsifying component, i.e. the emulsion containing the oxidized polyethylene, preferably includes an emulsifyingauxiliary agent, preferably a long chain glycol ether, the emulsification being carried out under pressure. The emulsion may also contain an alkali or amine and a substance such as sodium thiosulfate in addition to any other washing agents as may be required.

According to an important feature of the invention, the oxidized-polyethylene emulsion is formed from the oxidized polyethylene polymolecular wax in a ratio of about 3:1 to 6:1 of the nonionic emulsifier, in a ratio of about 7:1 to about 12:1 of the glycol ether, in a ratio of about 20:1 to 60:1 of the potassium hydroxide and in a ratio of 50:1 to 150:1 to sodium thiosulfate. The emulsion may then contain 5 to 40% by weight of the oxidized polyethylene (polymeric wax) and is made up to a 100% with water. Preferably the wax emulsion contains between 20 and 30% by weight solids.

SPECIFIC EXAMPLES

A. Example of Polymer Wax Emulsion for Addition to Synthetic-Resin Dispersion

| | |
|---|---|
| polymer wax (AC-302) | 19.1% by weight |
| nonionic emulsifier (isooctyl-phenol polyethoxyethanol containing 10 moles of ethylene oxide per mole) TRITON X-100 (Trademark of Kohm & Haas, Philadelphia) | 4.7% by weight |
| glycol ether (DOWANOL DPM - Trademark) | 2.2% by weight |
| potassium hydroxide | 0.5% by weight |
| sodium thiosulfate | 0.2% by weight |
| distilled water | 73.3% by weight |

The resulting product is a wax emulsion containing 25% by weight solids and having a viscosity of about 150 cp and a transparency or light transmissibility of 80%.

The polymer wax is the Phillips-process polyethylene subjected to oxidative cracking and marketed under the trademark A-C 392 by ALLIED CHEMICAL CO., the product having a total oxygen content of 2.84% by weight of which 0.5% by weight is in the form of peroxide and 0.25% by weight is in the form of carbonyl. The acid number is 26.1 and the ester number is 15.5. In spite of the increase of the surface tension of the polyethylene by about 30 dynes/cm with the increasing acidity of the polymer wax, much of the acid functionality remains unexpended in the emulsification process.

In fact, the carboxyl groups promote emulsification especially when they are wholly or partly neutralized by amine or alkali.

The emulsifying component is, in the example stated, a nonionic alkylarylpolyalkoxy adduct and is used with an emulsifying auxiliary or coupling agent in the form of the glycol ether. The glycol of the latter can be diethylene glycol, dipropylene glycol or ethylene glycol while the ether group may be any of the lower alkyl mono and diethers, i.e. ethers in which the alkyl portions contains 1 to 6 carbon atoms. Ester groups may also be present. Typical of the ether groups which may be used in the coupling agent are monomethylether, monoethylether acetate, monobutylether, monobutylether acetate, dibutylether and dimethyl ether.

As already stated, the aforementioned emulsion is introduced into a synthetic resin dispersion of conventional composition in an amount so as to provide between 0.5 and 50% by weight of the dry material of the polymer wax (oxidized polyethylene) therein. The polymer wax, prepared as discussed in SOAP AND CHEMICAL SPECIALTIES, August, 1969, page 42, and United Kingdom patent specification No. 1,021,696, is preferably present in an amount of 1 to 15 percent by weight of the dry product.

In general the weight percentages of the ingredients with which the emulsion of polymer wax is mixed, in terms of the floor-polishing dispersion, is as follows:

| | |
|---|---|
| Synthetic Resin (Styrene-ethylacrylate + butylacrylate copolymer) | 2 to 16% |
| Resin (Styrene-maleic anhydride) | 0 to 10 |
| Washing Agent (Cleaning compounds: e.g. nonylphenol ethylene-oxide adducts + cleaning salts) | 0.5 to 8.0 |
| Plasticizer (Permanent plasticizer such as phthalate compounds, application plasticizers + coupling agents) | 0.2 to 5.0 |
| Covering Agent (Fluorocarbonic acid) | 0.001 to 0.05 |
| Emulsifier (Alkylphenolpolythyleneoxide adducts as main plasticizers and coupling agents such as glycols and their derivatives) | 0.05 to 10.0% |

The synthetic resin dispersion is preferably an acrylate copolymer with a styrene component and preferably is a copolymer of styrene and ethylacrylate, containing some butylacrylate which has been found to improve the glossing or shining properties. However, other acrylates can be used as will be apparent hereinafter.

The synthetic resin dispersion into which the polymer wax emulsion is introduced can also contain a resin of the type commonly employed therein preferably a styrene-maleic acid anhydride resin. The plasticizer is preferably a phthalic acid ester in conjunction with a glycol ether, while the wetting agent is preferably a fluorinated carbonic acid. The cleaning agents may be alkylphenol K, ethylene adducts together with sodium and other so-called cleaning phosphates. The preferred phosphate is trisodiumphosphate and this may even be used alone. The wetting agent mentioned above is, of course, intended to promote coverage of the substrate and facilitates the formation of a uniform coating thereon.

B. Self-Polishing Cleaning Waxes

The following waxes are formed by addition of the aforementioned emulsion to synthetic-resin containing waxes to yield products with the following proportions:

Product I

| | | |
|---|---|---|
| oxidized polyethylene | 4.0 | parts by weight |
| synthetic resin (styrene-ethyl acrylate copolymer containing butylacrylate) | 10.0 | parts by weight |
| washing activator (nonylphenolpolyoxyethylene) | 0.7 | parts by weight |
| plasticizer (dibutylphthalate) | 2.9 | parts by weight |
| trisodiumphosphate (cleaning salt) | 1.15 | parts by weight |
| covering agent (perfluorocarbonic acid) | 0.01 | parts by weight |

Product II

| | | |
|---|---|---|
| oxidized polyethylene | 5.3 | parts by weight |
| synthetic resin (styrene-ethylacrylate copolymer containing butylacrylate | 9.6 | parts by weight |
| washing activator (nonylphenolpolyoxyethylene) | 0.7 | parts by weight |
| plasticizer (dibutylphthalate) | 2.5 | parts by weight |
| trisodiumphosphate (cleaning salt) | 1.15 | parts by weight |
| covering agent (perfluorocarbonic acid) | 0.01 | parts by weight |
| styrene-maleic acid anhydride resin | 1.0 | parts by weight |

To facilitate the practice of the invention, the following Example of a product corresponding to Product II is presented below as Product A in terms of the available sources of the various ingredients:

Product A

| | |
|---|---|
| polymer wax, emulsified as described, in a 30% by weight emulsion (Allied Chemical Co., New York) | 17.6% By weight |
| synthetic resin - Morton Latex No. A 427 (Morton-William Chemical Co., Chicago) | 24.0% By weight |
| distilled water | 42.9% By weight |
| ALRESAT 101 640 C (Trademark Reichhold-Albert Chemie, Wiesbaden) 16% * | 6.5% By weight |
| LUTENSOL AP 10 (Trademark of BASF, Leverkusen, Germany) as cleaning agent | 0.7% By weight |
| BALATINOL C (Trademark of BASF as plasticizer | 1.5% By weight |
| diethyleneglycol monoethyl-ether (plasticizer coupling agent) | 1.0% By weight |
| trisodiumphosphate (10% aqueous solution) | 4.5% By weight |
| FC 128-solution - 1% (3 M-Company, Dusseldorf) covering agent | 1.0% By weight |
| perfume etc. | 0.3% BY weight |

In place of ALRESAT (trademark), a styrene-maleic acid anhydride resin, it has been found to be advantageous to use PENTYLYN RESIN 261 (trademark of Hercules Co.) The LUTENSOL (trademark) a nonylphenolethylene oxide adduct containing 10 ethylene oxide groups can be replaced by other alkylphenolethylene oxide adducts having alkyl groups containing 7 to 10 carbon atoms and 6 to 12 ethylene oxide groups per molecule. A suitable substitute is ARKOPAL (trademark of Farbwerke Hoechst A.G.). DOWANOL (Trademark of Dow Chemical) which is a dipropyleneglycolmethylether may aso be used.

THe PALATINOL (trademark) is dibutylphthalate and constitutes a permanent plasticizer while ethyldiglycol is a substance wich couples the permanent and temporary plasticizer and is effective during the emulsification. Any similarly effective plasticizing agent may be used in place of it. The covering agent FC-128 (trademark) solution is a perfluorinated carbonic acid and can be replaced by others of similar composition.

When the emulsion/dispersion identified as Product A, is applied to the floor and dried, the drying film has the composition represented as Product II. The proportions of the wax like polyethylene can vary within wide limits although preferably between 1 and 15 weight percent as already indicated.

It should be understood, however, that enhancement of certain properties may be tied to a decline in others. For example, an increase in the proportion of cleaning agents will result in increased cleaning power but will reduce the resistance of the polishing layer to water-washing. The following Tables compare the product A above with commonly available self-polishing cleaning floor waxes and the like:

The notation in these Tables is the following:

The respective result is shown and each is divided into five categories, from best to worst:

| trace better or worse | ± 1 |
|---|---|
| somewhat better or worse | ± 2 |
| markedly better or worse | ± 3 |
| much better or worse | ± 4 |
| extremely better or worse | ± 5 |

Table 1

Effect on the use of several commercially available copolymer materials as synthetic resin dispersing components.

| copolymer | A | B | C | D | E |
|---|---|---|---|---|---|
| coverage | 0 | 0 | 0 | 0 | 0 |
| flow | 0 | −1 | 0 | −1 | −2 |
| gloss | 0 | −2 | −1 | −2 | −3 |
| rubber stroke | 0 | −1 | 0 | −1 | 0 |
| scuffing | 0 | 0 | 0 | 0 | +2 |
| scratch resistance | 0 | 0 | 0 | 0 | +2 |
| polishability | 0 | 0 | 0 | 0 | 0 |
| soil pickup | 0 | +1 | +1 | +1 | 0 |
| powdering tendency | 0 | 0 | 0 | 0 | 0 |
| water-washing | 0 | −2 | 0 | −1 | −2 |
| alkali-detergent-washing | 0 | +1 | +3 | +2 | 0 |
| removal by soap detergent | 0 | −1 | −3 | −1 | +1 |

One can deduce from the table which uses Example II as a reference point, that one can also use, for example, copolymer C thereby obtaining a reduced gloss, a greater resistance to soap, a slightly better resistance to soil pickup and a better resistance to alkali cleansers.

Table 2

Effect on the use of different wax-like polyethylenes.

| | Products | | | |
|---|---|---|---|---|
| | A (new) | B | C | C |
| coverage | 0 | 0 | 0 | 0 |
| flow | +1 | 0 | 0 | 0 |
| gloss | +3 | 0 | 0 | 0 |
| soil pickup | 0 | 0 | 0 | 0 |
| rubber stroke | +2 | 0 | 0 | 0 |
| scuffing | +3 | 0 | 0 | +4 |
| scratch resistance | +3 | 0 | 0 | +3 |
| polishability | −1 | 0 | 0 | −1 |
| powdering tendency | +1 | 0 | 0 | +1 |
| water-washing | 0 | 0 | 0 | 0 |
| alkali-washing | +2 | 0 | 0 | +2 |
| removal by soap detergent | −2 | 0 | −1 | −1 |

This table clearly shows the superiority of the product of Example II which contains the new polymer A. This superiority is particularly manifested in the shine and the resistance to marring, rubber strokes, scuffing and scratch resistance.

Examples B and C are made with other commercially available polyethylene waxes. Example D is made with a soft copolymer.

The superiority of the floor wax, according to the invention, can be seen also by comparison with commercially available products. In the following Tables the comparison with three products which at present constitute 80% of the market, is shown:

Table 3

| Reaction in Practice | |
|---|---|
| gloss | + ⅔ |
| soil pickup | + ⅔ |
| soil adhesion | + ½ |
| pickup of black rubber strokes | + ⅔ |

The tests were made of the stability of the film in locations of a high degree of traffic, e.g. on a school floor in which the film was crossed by more than 10,000 individuals. The foregoing Table represents the product A as compared with a conventional self-polishing wax rated zero.

Table 4

Self-shine at repeated film coating

| | 1. Coating | | 2. Coating | |
|---|---|---|---|---|
| Product | Flow | Gloss | Adhesion | |
| A | 0 | +⅔ | 0 | +⅔ |
| X | 0 | 0 | 0 | 0 |
| Y | 0 | 0 | −½ | −2 |
| Z | 0 | 0 | −3 | −¾ |

Definitions
| flow | : | uniformity of coating (continuity) |
| gloss | | appearance of gloss (visual) |
| adhesion | : | effect on the coating with new coating application at intervals of 20 minutes |
| total | : | sum of flow and gloss results relative to solubility |

Product A, according to the invention, compared to commercially available products X, Y, Z, shows a marked superiority.

Product A, according to the invention, compared to commercially available products X, Y, Z, shows a marked superiority.

Table 5

| | Test with 1000 - Passage Traffic | | | |
|---|---|---|---|---|
| Product | Gloss | Soil Pickup | Walk Traces | Total |
| A | +⅔ | +3 | +3 | +3 |
| X | 0 | 0 | 0 | 0 |
| Y | 0 | −½ | −2 | −2 |
| Z | 0 | −3 | −3 | −¾ |

Table 6

CLEANING WITH PRODUCTS
(Washing with 10% solutions without after-polishing)

| Product | Gloss | Soil and Removal of Walk Traces | Washing Traces | Total |
|---|---|---|---|---|
| A | +3.4 | +½ | +⅔ | +3 |
| X | 0 | 0 | 0 | 0 |
| Y | −½ | −1 | −½ | −2 |
| Z | −½ | −3 | 0 | −3 |

NOTE: After wiping, all of the conventional products (X, Y and Z) show a reduction in brightness and gloss. The opposite is the case with the product according to the present invention.

The composition of the present invention has certain advantages over the art which may be summarized as follows:

When the composition of the present invention is applied over a previous layer of identical composition, the previously deposited film is soluble in the newly applied film and results in the application of a smooth homogeneous layer.

The system of the present invention provides a cleaner using purely aqueous cleaning components which is far more effective than previous self-polishing preparations, including those heretofore identified as self-polishing cleaning waxes. The product even has some of the characteristics of solvent cleaning preparations without self-polishing features. The disadvantages of preparations of the latter type, include surface clouding, flammability of the preparation and deterioration of the layer in the presence of moisture. It is frequently necessary to mechanically polish the layer repeatedly before it can develop a high brightness. The system of the present invention provides self-polishing action and, in addition, a wiping effect which enhances the shine.

The dry layer, according to the invention, provides a film or layer of high stability but without a skin-like coating applied by some prior-art waxes. In other words, the layer is not a viscoelastic film of high stability, but rather is a coherent layer tenaciously clinging to the surface but insufficiently bonded within the layer to create the continuous elastic film discussed above.

We claim:

1. A selfgloss cleaning polish for a substrate consisting essentially of:
   a. between 0.5 and 50% by weight of the dry polish of an oxidized linear low molecular weight oxidation cracked polyethylene wax made by the Phillips process and having a molecular weight between about 8,000 and 10,000, an acid number of about 26.1, an ester number of about 15.5, a softening point of 138° to 147°C and a density of $D_{20}=0.99$;
   b. an aqueous dispersion of ethylacrylate - styrene copolymer or butylacrylate-styrene copolymer, in a weight ratio to said polyethylene wax of 3:1 to 1:1, and styrenemaleic acid anhydride in a weight ratio to said polyethylene wax between 1:3 and 1:10;
   c. a glycol ether in a weight ratio to said polyethylene wax of 1:7 to 1:12;
   d. potassium hydroxide in a weight ratio to said polyethylene wax of 1:20 to 1:60;
   e. sodium thiosulfate in a weight ratio to said polyethylene wax of 1:50 to 1:250;
   f. butylphthalate as a plasticizer in a weight ratio to said polyethylene wax of 1:5 to 1:1; and
   g. 0.5 to 8.0 percent by weight of the dry polish trisodium phosphate as a cleaning compound.

* * * * *